Figure 1:
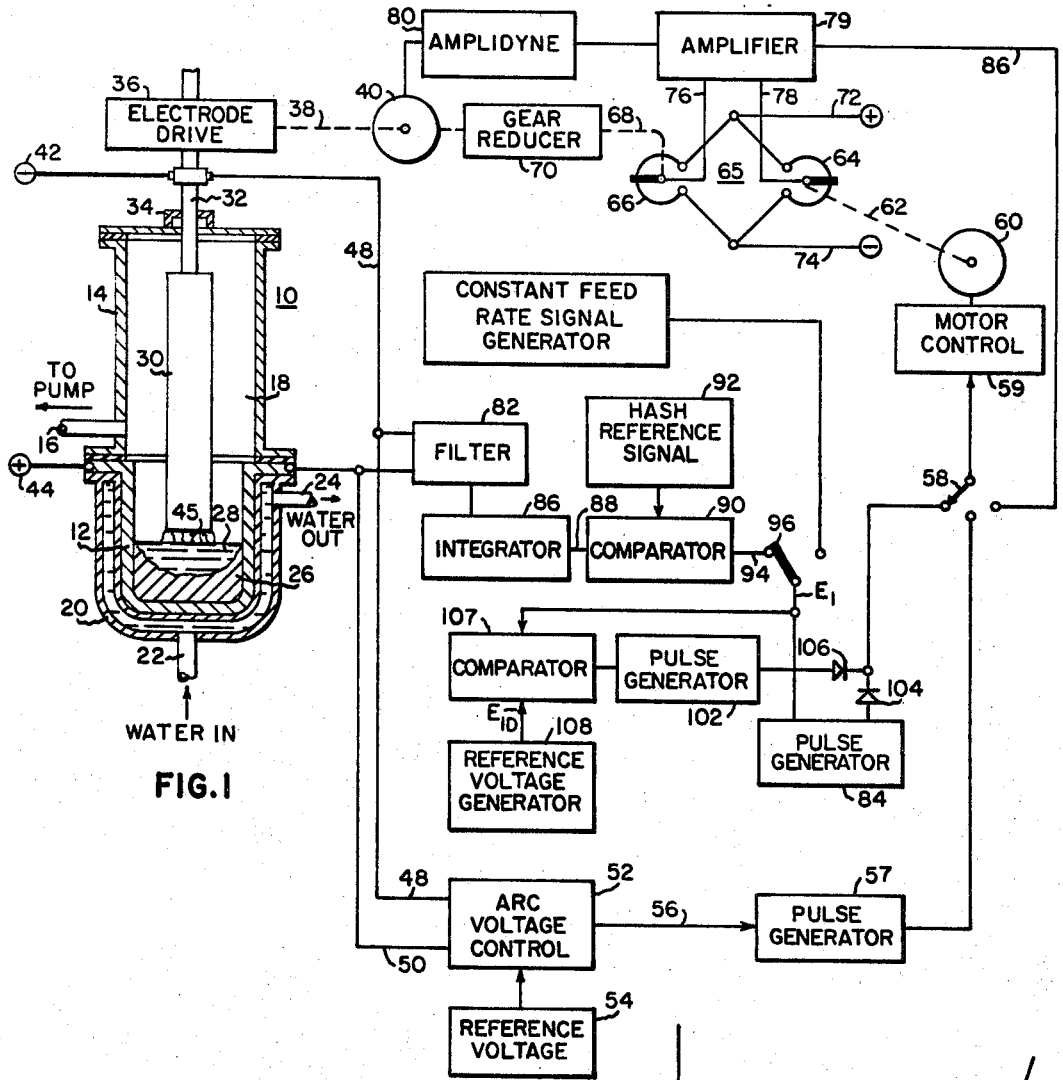

May 28, 1968   S. S. HARBAUGH ET AL   3,385,920

CONTROL SYSTEM FOR CONSUMABLE ELECTRODE FURNACE

Filed Oct. 1, 1965

INVENTORS
SAMUEL S. HARBAUGH
DONALD C. McCARTER &
PETER A. LAJOIE.

BY

ATTORNEY

United States Patent Office 3,385,920
Patented May 28, 1968

3,385,920
CONTROL SYSTEM FOR CONSUMABLE
ELECTRODE FURNACE
Samuel S. Harbaugh, Natrona Heights, Pa., Donald C. McCarter, Schenectady, N.Y., and Peter A. Lajoie, Natrona Heights, Pa., assignors to Allegheny Ludlum Steel Corporation, Brackenridge, Pa., a corporation of Pennsylvania
Filed Oct. 1, 1965, Ser. No. 491,946
8 Claims. (Cl. 13—13)

This invention relates to a control system for a consumable electrode furnace, and more particularly to a servo control system for a consumable electrode furnace wherein a characteristic of an electrical arc between the electrode and a molten pool of metal beneath it is employed to control the position of the electrode with respect to the molten pool.

As is known, consumable arc melting furnaces usually comprise an electrode of the metal to be melted extending downwardly into a mold or crucible which receives the molten metal and within which an ingot is formed. The electrode is connected to one terminal of a direct current voltage source, and means are provided for electrically connecting the other terminal of the source to the mold and, hence, to the molten metal. Usually, in starting the melt, a small supply of chips or the like is placed in the mold so that when the arc is struck the chips are melted to form an initial molten metal supply in the crucible mold. After the arc is initially struck, it is maintained between the electrode to be melted and the molten pool of metal beneath it, the electrode being melted due to the heat of the arc. As the lectrode is melted, it is deposited in and forms the aforesaid molten pool, the bottom portion of which continuously solidifies as the electrode melts to form an ingot which increases in length, starting from the bottom upwardly. In this process, impurities float to and on the top of the molten pool; and assuming that the pool does not solidify during the formation of the ingot, the major portion of the impurities will be excluded from the main body of the ingot.

In any consumable electrode furnace, it is desirable to provide a constant and uniform melt rate in order to produce ingots of good quality. A constant melt rate, in turn, necessitates a fine control of the position of the electrode relative to the molten pool beneath it to maintain a more or less fixed arc gap. In most cases, electrical motors are employed to effect electrode movement; and these motors are controlled as a function of an electrical characteristic of the arc which spans the distance between the bottom of the electrode and the molten pool beneath it. This characteristic is indicative of the arc length and may, for example, comprise arc gap voltage or recurring increases in impedance ("hash") of characteristic frequency superimposed on the impedance associated with base arc voltage and current. The hash effect and its application to control systems may be understood by reference to U.S. Patents No. 3,186,043 and 3,187,078, both of which issued on June 1, 1965, and are assigned to the assignee of the present application.

From the foregoing, it will be appreciated that a control system for a consumable electrode furnace comprises a servo-loop arrangement in which an electrical signal proportional to arc voltage, "hash" or the like is applied to the drive motor as a control signal to maintain the arc gap constant, or at least approximately constant. In many consumable electrode melting systems, regardless of whether hash, arc voltage or another characteristic of the arc is employed for control purposes, some slow oscillation of ram feed rate is sometimes noted. This is usually due to a high gain factor in the servo loop comprising the control system for the electrode ram. As in most servo systems, the instability can be eliminated by a reduction of the loop gain; however, due to circuit characteristics, the necessary feed rate and low gain ordinarily cannot be obtained simultaneously within the loop itself.

When "hash" comprising the impedance changes mentioned above is employed to control the electrode, the electrode feed rate is continuously adjusted by a hash count rate regulator in an effort to keep the hash count rate at a preset value. However, in many instances, arc conditions exist which temporarily produce high hash count rates causing the electrode to stop feeding when better melting conditions would be obtained by maintaining some feed rate near the long-time average feed rate value. Thus, when a temporary abnormal arc condition produces high hash count rate, the feed rate output of the hash rate regulator normally stops; whereas it is desirable for it to continue under such abnormal conditions.

As an overall object, the present invention seeks to provide a control system for a consumable electrode furnace which overcomes the foregoing and other disadvantages of prior art systems of this type.

More specifically, an object of the invention is to provide a servo-loop control system for a consumable electrode furnace wherein the necessary feed rate and low gain can be obtained simultaneously, thereby eliminating the aforesaid undesirable slow oscillation of ram feed rate.

Another object of the invention is to provide a hash control system for a consumable electrode furnace wherein a temporary abnormal arc condition will not materially affect the feed rate of the electrode as was the case with prior art systems of this type.

In accordance with the invention, a bias signal is superimposed on the main control signal in the servo loop of a consumable electrode furnace such that the magnitude of the main control signal and its gain factor can be reduced for any given operating condition. At the same time, the bias signal insures that should the main control signal fail because of abnormal arc conditions, the electrode will continue its downward movement without interruption.

Figure 3:
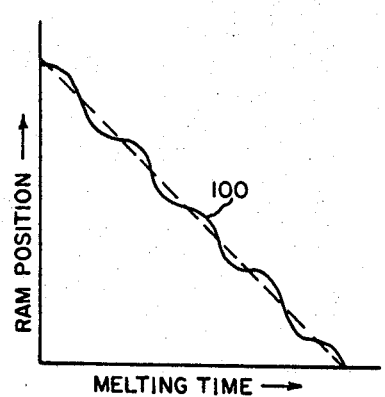
Figure 2:
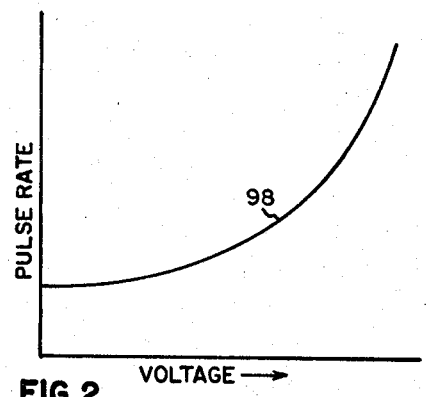

The above and other objects and features of the invention will become apparent from the following detailed description taken in connection with the accompanying drawings which form a part of this specification, and in which:

FIGURE 1 is a block and schematic circuit diagram of the control system of the invention;

FIG. 2 is a plot of control voltage versus pulse rate illustrating the manner in which the present invention compensates for high loop gain; and FIG. 3 is a graph of melting time versus ram position showing the undesirable oscillation sometimes produced in ram feed rate with prior art systems, as contrasted with the substantially non-oscillatory feed rate produced with the system of the present invention.

With reference now to the drawings, and particularly to FIG. 1, a consumable electrode arc furnace is schematically illustrated and identified by the reference numeral 10. The furnace comprises a conductive mold or crucible 12 which may, for example, be fabricated of copper. Covering the upper open end of the mold 12 is a gas-tight housing 14 having a connection at 16 to means, not shown, for evacuating the chamber 18 formed by the mold 12 and the housing 14 covering it. Alternatively, the chamber 18 could be filled with an inert gas; however in either case the metal to be melted is protected from oxidation. Surrounding the mold 12 is a water jacket 20 having inlet and outlet ports 22 and 24 connected thereto.

The mold 12 contains the ingot 26 which is formed from a molten pool 28 adjacent the lower end of an electrode 30 of the metal to be melted. Electrode 30 extends upwardly from the mold 12 and is connected at its upper end to a reciprocable rod or electrode ram carrier 32 which extends through a seal 34 in the housing 14. The ram 32 is connected to a suitable drive which may be mechanical or hydraulic; however in either case the drive is controlled by an electrical signal as will hereinafter be explained. In this particular embodiment, the electrode drive 36 comprises a rack and pinion, chain, or worm and screw arrangement connected through shaft 38 to a drive motor 40, the arrangement being such that as the motor 40 is rotated in one direction, the ram 32 and electrode 30 carried thereby will move upwardly; whereas rotation of the motor 40 in the opposite direction will cause downward movement of the electrode 30.

During a melting operation, the ram 32 and electrode 30 move downwardly only, the upward movement of the ram being used only to reposition it preparatory to a succeeding melting operation. Connected to the ram 32 and, hence, to the electrode 30 is the negative terminal 42 of a direct current voltage source, not shown. The positive terminal 44 of this same voltage source is connected to the mold 12, the arrangement being such that an arc 45 will be struck between the lower end of the electrode 30 and the bottom of the mold 12, thereby forming heat which progressively melts the end of the electrode and causes the formation of the aforesaid molten pool 28. As the electrode 30 is melted it is, of course, necessary to move it downwardly by means of the motor 40 and electrode drive 36 in order to maintain the desired arc gap.

As was mentioned above, it is the practice to control the position of the electrode 30 to maintain the desired arc gap and a constant and uniform melt rate by controlling the motor 40 as a function of an electrical characteristic of the arc. One such characteristic which is used is the voltage across the arc. Another characteristic, more fully described below, is the occurrence of voltage discontinuities in the form of positive-going pulses which are superimposed on the base arc voltage, each of which persists for a short time such as 40 milliseconds at a frequency below about 30 cycles per second. This characteristic, known as "hash," can be used, like arc gap voltage, for the purpose of controlling the motor 40 and, hence, the downward movement of the electrode 30.

If an attempt is made to control the position of the electrode as a function of a characteristic of the arc alone, the same control signal will be employed to drive the motor 40 at the start of the melt for a desired movement as is used for the same desired movement at the end of the melt when the mass and inertia of the electrode are materially reduced. However, at the start of the melt, much of the torque developed by the motor 40 will be utilized in overcoming frictional and inertial forces which are materially reduced at the end of the melt due to the decreased weight of the electrode. Since the signal does not take these forces into account, a constant and uniform movement of the electrode 30 is not achieved.

A system for overcoming the foregoing difficulty is described in detail in U.S. Patent No. 3,187,077, issued June 1, 1965, and assigned to the assignee of the present application. While not necessarily a part of the present invention, that system will be described herein since it is particularly adaptable for use with the invention.

As was explained above, the characteristic of the arc gap used to control the electrode 30 may be either arc voltage or "hash." Arc voltage control will be considered first. The arc voltage is applied through leads 48 and 50 to an arc voltage control circuit 52 where it is compared with a reference voltage from source 54. The difference voltage from circuit 52 may then be applied through lead 56 to a pulse generator 57, the arrangement being such that as the arc voltage increases, indicating a wider arc gap, the frequency of the pulses at the output of generator 57 increases. These pulses are applied through switch 58 to a control circuit 59 for a servomotor 60, the servomotor being mechanically connected through linkage 62 to the movable tap on a first potentiometer 64. The potentiometer 64 is included in a bridge circuit arrangement 65 which includes a second potentiometer 66 having its movable tap connected through mechanical linkage 68 and a gear reducer 70 to the drive motor 40, the arrangement being such that as the electrode 30 is moved downwardly by the motor 40, the tap on potentiometer 66 will be caused to advance in an amount proportional to the downward movement of the electrode. The bridge circuit 65 comprising the potentiometers 64 and 66 is energized from a source of voltage, not shown, through input terminals 72 and 74; while output signals from the bridge circuit configuration are applied through leads 76 and 78 and amplifier 79 to an Amplidyne (trademark) circuit 80 which, as will be understood, controls the motor 40.

It will be assumed that the movable tap on potentiometer 64 rotates in a clockwise direction while the tap on potentiometer 66 rotates in a counterclockwise direction. At the start of a melting operation with the ram 32 in its uppermost position, the tap on potentiometer 66 will be, for example, at its top dead-center position. Similarly, the tap on potentiometer 64 will be adjusted manually or otherwise such that it is also at the top dead-center position. Consequently, under these circumstances, no output signal is applied to the Amplidyne control circuit 80 through leads 76 and 78 and amplifier 79.

In order to initiate the melting operation, switch 58 is moved to its lowermost position illustrated in the drawing such that motor control circuit 59 for servomotor 60 is connected to amplifier 79. In this manner, the servomotor will be directly responsive to any unbalance in the bridge and will act to bring it back into balance. Therefore, at the instant of strike arc, the bridge will be balanced. Immediately thereafter, switch 58 connects circuit 59 to either pulse generator 57 or pulse generator 84, depending upon whether hash control or arc voltage control is desired. Initially it will be assumed that circuit 59 is connected to generator 57 such that it responds to base arc voltage variations.

When the arc is struck between the electrode 30 and the bottom of the mold 12, the electrode will begin to melt, and as it melts the base arc voltage will increase to the point where it exceeds the reference voltage 54. This produces a signal on lead 56 which, assuming that switch 58 is in its center position, causes the pulse generator 57 and motor control circuit 59 to rotate the servomotor 60. When servomotor 60 rotates, the tap on potentiometer 64 will be caused to rotate in a clockwise direction, thereby unbalancing the bridge circuit configuration 65 and producing an output signal on leads 76 and 78 to actuate drive motor 40 to move the electrode 30 downwardly. This causes the arc voltage to decrease and at the same time rotates the tap on potentiometer 66 in a counterclockwise direction to again balance the bridge. When the arc voltage again increases due to continued melting of the electrode, the servomotor 60 will again rotate it to move the tap on potentiometer 64 further in a clockwise direction. As will be appreciated, the motor 40 will follow this action to move the electrode 30 downwardly with the tap on potentiometer 66 following that on potentiometer 64 to maintain the bridge balanced.

Thus, as the electrode continues to melt, the motor 40 is caused to move it downwardly continually with the downward movement being controlled by the actual physical position of the electrode 30 in combination with arc voltage rather than the arc voltage alone as in prior art systems. Therefore, regardless of the difference in inertial and frictional forces at the beginning and end of a melting operation, the motor 40 will be caused to move the electrode 30 downwardly in a proper amount by virtue of the action of the potentiometer 66.

Considering, now, the case where "hash" control is employed, the arc voltage is again sensed; however it is passed through a filter 82 to eliminate the ripple content in the direct current voltage applied to the terminals 42 and 44. As is known, a direct current, other than that derived from a battery or other chemical source, is not absolutely unvarying in its magnitude, but will contain a small ripple which is due either to the rectifiers employed in rectifying an alternating current voltage or due to the action of a commutator in a direct current generator. The direct current voltage is, therefore, passed through the filter 82 which eliminates the ripple content therein. In one specific application, the filter 82 is such as to pass only those recurring voltage fluctuations having a frequency beneath about 30 cycles per second. The specific value of 30 cycles per second, however, is not to be considered as limiting, the only requirement being that the filter eliminate the ripple content. It would, of course, be expected that after passing through the filter 82 which eliminates the ripple content of the direct current voltage, a more or less unvarying steady-state direct current voltage would be obtained. Contrary to expectations, however, and as is explained in the aforesaid U.S. Patents Nos. 3,186,043 and 3,187,078, the output of the filter 82 comprises positive-going voltage discontinuities superimposed on the base direct current arc voltage. These voltage discontinuities characteristically occur in bunches, each discontinuity persisting for about 40 to 100 milliseconds, and comprise the "hash" discussed above. The exact reason for the occurrence of the voltage discontinuities or hash is unknown; however the fact is that they do occur and can be used for controlling the position of the electrode 30. As will be understood, the increases in voltage comprising the hash pulses occur as a result of an increase in the impedance across the arc 45. Simultaneous with each increase in impedance and increase in arc voltage is a decrease in arc current; and these periodic decreases in arc current can also be used for purposes of control, as will be understood.

The output of the filter 82 comprising the voltage discontinuities is applied to an integrator 86 which produces a steady-state output voltage on lead 88, the magnitude of which is proportional to the actual hash rate. It is, of course, desired to maintain the electrode at a fixed distance from the molten pool 28; and this distance, in turn, has a direct relationship to the hash rate. Thus, there is a desired magnitude of the steady-state signal on lead 88, at which magnitude the electrode is properly positioned with respect to the molten pool. In order to determine the magnitude of the steady-state signal on lead 88, it is compared in comparator 90 with a hash reference signal from circuit 92. The signal from circuit 92, of course, is also a steady-state signal and has the aforesaid desired magnitude such that if the signal on lead 88 is above or below the desired value, an error signal $E_1$ will appear on lead 94. This signal is normally applied through switch 96 to the pulse generator 84.

The pulse rate output of generator 84 versus input voltage is shown in FIG. 2. It will be noted that as the magnitude of the input voltage increases, the slope of curve 98 also increases, indicating a high gain factor at the higher pulse rates. If the system is operated at the upper end of curve 98 (i.e., high gain), an undesirable slow oscillation of the ram feed rate will occur as illustrated by curve 100 of FIG. 3. This, of course, is to be expected in a servo system of the type described herein and, for that matter, in any servo system. Of course, when the input voltage to pulse generator 84 is relatively low, the system is operating at the lower end of curve 98 where the slope is not nearly as steep, and the gain low.

In accordance with the present invention, the pulse generator 84 is caused to operate at a lower pulse rate than the desired pulse rate for a given error signal. Thus, the pulse generator 84 is always operated at the lower end of curve 98, notwithstanding the fact that a higher pulse rate might be desired. In order to compensate for the reduced pulse rate, a second pulse generator 102 is provided and is adapted to be connected through switch 58 to motor control circuit 59 as shown. The pulse generators 84 and 102 are connected to switch 58 through diodes 104 and 106, respectively, in order to isolate the respective pulse generators and prevent pulses from one generator from being fed into the output of the other generator.

The pulse generator 102, in turn, is driven by means of a direct current signal derived from a comparator 107. The input to comparator 107 comprises the signal $E_1$ which will vary as the hash rate varies, together with a signal $E_{1D}$ derived from a reference voltage generator 108. The pulse output from generator 84 will, of course, vary as the input signal $E_1$ varies, but at a lower rate than is necessary to actuate motor control circuit 59 for moving the electrode 30 downwardly at the desired rate. The "missing" pulses are derived from pulse generator 102 as determined by a comparison of signal $E_1$ with the signal $E_{1D}$. That is, if the pulse rate from pulse generator 84 is sufficient under a given set of circumstances, the signal $E_1$ will be equal to $E_{1D}$. On the other hand, if the output of pulse generator 84 should fall behind the desired pulse rate, the comparison of signals $E_1$ and $E_{1D}$ will produce an output signal $E_2$ which drives pulse generator 102. Pulse generator 102, in combination with generator 84, now produces the desired number of pulses; however pulse generator 84 in the servo loop itself is operating at the lower end of curve 98 where undesirable oscillation does not occur.

As was mentioned above, in many instances arc conditions exist which temporarily produce high hash count rates. This causes the electrode 30 to stop feeding when better melting conditions would be obtained by maintaining some feed rate near the long-time average feed rate value. In other words, when a temporary abnormal arc condition causes a high hash count rate the error signal $E_1$ will be reduced, thereby reducing the pulse output of generator 84. If only the generator 84 were included in the circuit of FIG. 1, the downward movement of the electrode 30 would stop. However, by virtue of the fact that pulses from generator 102 are being fed into the system during this time, the electrode 30 will continue to move downwardly at a rate whose deviations from the average feed rate are neither cyclic nor excessive, thereby eliminating the aforesaid undesirable stopping of the electrode.

If it is desired to move electrode 30 downwardly at a constant rate, the switch 96 is connected to a source of voltage 110 which causes generators 84 and 102 to produce output pulses of fixed repetition rate. Hence, the electrode 30 will now move downwardly at a fixed rate regardless of the hash or base arc voltage conditions. Such a condition may be employed, for example, when the electrode is initially moved downwardly toward the bottom of the mold to start a melting operation.

Although the invention has been shown in connection with certain specific embodiments, it will be readily apparent to those skilled in the art that various changes in form and arrangement of parts may be made to suit requirements without departing from the spirit and scope of the invention.

We claim as our invention:

1. In a consumable electrode furnace of the type in which an arc is struck between a consumable electrode and a molten pool of metal beneath it and in which an electrically-controlled motor device is employed to move the electrode downwardly toward the molten pool as it is consumed; the combination of means for producing an electrical signal which varies non-linearly as a function of the spacing between the electrode and said molten pool, means for controlling said motor device in response to changes in said electrical signal in a servo-loop arrangement, the electrical signal having a high gain factor as its magnitude increases due to said non-linearity, and means for superimposing on said electrical signal an auxiliary signal of magnitude sufficient to permit the servo loop to operate at a lower gain factor for a given rate of movement of the electrode than it would without the auxiliary signal.

2. In a consumbale electrode furnace of the type in which an arc is struck between a consumable electrode and a molten pool of metal beneath it and in which an electrically-controlled motor device is employed to move the electrode downwardly toward the molten pool as it is consumed; the combination of integrating means for producing a steady-state electrical signal which varies as a function of the spacing between the electrode and said molten pool, a first pulse generator connected to the output of said integrating means for producing pulses which vary in repetition rate as a function of the spacing between the electrode and said pool, electrical circuit means responsive to said pulses in a servo-loop arrangement for controlling said motor device in response to changes in the repetition rate of said pulses, the pulse rate of the pulses at the output of said first generator having a high gain factor as their repetition rate increases, a second pulse generator, and means for applying the output of said second pulse generator to the electrical circuit means for controlling said motor device along with the pulse output of said first pulse generator to permit the servo loop to operate at a lower gain factor for a given rate of movement of the electrode than it would without the auxiliary pulse generator.

3. In a consumable electrode furnace of the type in which an arc is struck between a consumable electrode and a molten pool of metal beneath it and in which an electrically-controlled motor device is employed to move the electrode downwardly toward the molten pool as it is consumed; the combination of means for detecting recurring fluctuations in an electrical characteristic of said arc which recur within a predetermined frequency range, integrating means connected to said detecting means for producing a steady-state electrical signal which varies as a function of the spacing between the electrode and said molten pool, a first pulse generator responsive to changes in said steady-state signal for producing pulses which vary in repetition rate as a function of the spacing between the electrode and said molten pool, means responsive to said pulses in a servo-loop arrangement for controlling said motor device, the pulse rate of the pulses having a high gain factor as their repetition rate increases, a second pulse generator, and means for applying pulses from said second pulse generator to said electrical circuit means for controlling said motor device along with the pulses from said first pulse generator to permit the servo loop to operate at a lower gain factor for a given rate of movement of the electrode than it would without the auxiliary generator.

4. In a consumable electrode furnace of the type in which an arc is struck between a consumable electrode and a molten pool of metal beneath it and in which an electrically-controlled motor device is employed to move the electrode downwardly toward the molten pool as it is consumed; the combination of means for detecting recurring fluctuations in an electrical characteristic of said arc which recur within a predetermined frequency range, an integrator responsive to said recurring fluctuations, a first comparator connected to the output of said integrator for comparing the integrated output with a signal having a magnitude corresponding to the desired magnitude of the integrated output when the electrode is properly positioned with respect to the molten pool, whereby the output of the first comparator will comprise an error signal having a magnitude dependent upon the spacing between the electrode and said molten pool, a first pulse generator, means for applying said error signal to the first pulse generator, a second comparator for comparing said error signal with a steady-state signal the magnitude of which corresponds to the magnitude of the error signal when the first pulse generator is operating at a desired low gain factor, a second pulse generator controlled by the output of said second comparator, means for combining the outputs of said first and second pulse generators, and means responsive to the combined outputs of said first and second pulse generators for controlling said motor device in response to changes in the output of said integrator in a servo-loop arrangement.

5. The combination of claim 4 wherein the outputs of said first and second pulse generators are applied to said means for controlling the motor device through isolating diodes.

6. The combination of claim 4 and including means for producing a steady-state constant feed rate signal of fixed magnitude, and switch means for selectively disconnecting said first pulse generator from the first comparator and for connecting said first pulse generator to said constant feed rate generator.

7. In a consumable electrode furnace of the type in which an arc is struck between a consumable electrode and a molten pool of metal beneath it and in which an electrically-controlled motor device is employed to move the electrode downwardly toward the molten pool as it is consumed; the combination of means for producing a hash signal, means responsive to said hash signal for producing an electrical signal which varies nonlinearly as a function of the spacing between the electrode and said molten pool, means for controlling said motor device in response to changes in said electrical signal in a servo-loop arrangement, the electrical signal having a high gain factor as its magnitude increases due to said non-linearity, and means responsive to said hash signal for superimposing on said electrical signal an auxiliary signal of magnitude sufficient to permit the servo loop to operate at a lower gain factor for a given rate of movement of the electrode than it would without the auxiliary signal.

8. The combination of claim 7 wherein said hash signal is derived by filtering from the voltage existing across said arc any ripple content therein.

References Cited

UNITED STATES PATENTS

| | | | |
|---|---|---|---|
| 3,187,077 | 6/1965 | Murtland et al. | 13—13 |
| 3,187,078 | 6/1965 | Murtland et al. | 13—13 |

BERNARD A. GILHEANY, *Primary Examiner.*

R. N. ENVALL, *Assistant Examiner.*